(12) United States Patent  
Kormann et al.

(10) Patent No.: US 9,179,595 B2
(45) Date of Patent: Nov. 10, 2015

(54) ASSEMBLY AND METHOD FOR THE PRECISION DRILLING OF SEED GRAINS

(71) Applicant: Deere & Company, Moline, IL (US)

(72) Inventors: Georg Kormann, Zweibruecken (DE); Kilian Wolff, Blieskastel (DE); Uwe Vollmar, Zweibruecken (DE)

(73) Assignee: DEERE & COMPANY, Moline, IL (US)

( * ) Notice: Subject to any disclaimer, the term of this patent is extended or adjusted under 35 U.S.C. 154(b) by 268 days.

(21) Appl. No.: 13/785,659

(22) Filed: Mar. 5, 2013

(65) Prior Publication Data

US 2014/0076216 A1 Mar. 20, 2014

(30) Foreign Application Priority Data

Mar. 9, 2012 (DE) .......................... 10 2012 203 761

(51) Int. Cl.
 *A01C 7/18* (2006.01)
 *A01C 7/20* (2006.01)
 *A01C 21/00* (2006.01)
 *A01B 49/06* (2006.01)
 *A01C 5/06* (2006.01)

(52) U.S. Cl.
 CPC . *A01C 7/20* (2013.01); *A01B 49/06* (2013.01); *A01C 5/062* (2013.01); *A01C 21/005* (2013.01)

(58) Field of Classification Search
 USPC ............. 111/170, 200, 900, 903, 904; 701/50
 See application file for complete search history.

(56) References Cited

U.S. PATENT DOCUMENTS

| | | | |
|---|---|---|---|
| 5,809,440 A * | 9/1998 | Beck et al. ...................... 701/50 |
| 6,199,000 B1 * | 3/2001 | Keller et al. .................... 701/50 |
| 6,386,128 B1 | 5/2002 | Svoboda et al. |
| 6,516,271 B2 | 2/2003 | Upadhyaya et al. |
| 6,553,312 B2 | 4/2003 | Upadhyaya et al. |
| 6,941,225 B2 | 9/2005 | Upadhyaya et al. |
| 7,717,048 B2 | 5/2010 | Peterson, Jr. et al. |
| 7,726,251 B1 | 6/2010 | Peterson et al. |
| 8,078,367 B2 * | 12/2011 | Sauder et al. ................... 701/50 |
| 2009/0112475 A1 | 4/2009 | Christy et al. |

(Continued)

FOREIGN PATENT DOCUMENTS

| | | |
|---|---|---|
| DE | 19725546 A1 | 3/1999 |
| DE | 10148748 A1 | 4/2003 |

(Continued)

OTHER PUBLICATIONS

Moore, Sam. Check-Row Planting: By the Book [Online]. Farm Collector. Feb. 2009 [retrieved on Mar. 1, 2013]. Retrieved from the Internet: <http://www.farmcollectorcom/implements/check-row-planting-by-the-book.aspx>.

(Continued)

*Primary Examiner* — Alicia Torres

(57) ABSTRACT

An assembly and a method for the precision drilling of seed grains use a drilling machine with at least one row unit which is assigned a drive set up for instigating delivery of a seed grain into a furrow, and a control system which is connected to a position-determining system, to a memory device for storing delivery positions of seed grains, to the drive of the row unit and to a seed material sensor for detecting the actual delivery position of the seed grains in the furrow. The control system controls the drive based on signals from the position-determining system, the memory device and the seed material sensor so that the seed grains are delivered successively at the delivery positions.

11 Claims, 4 Drawing Sheets

(56) References Cited

U.S. PATENT DOCUMENTS

| | | |
|---|---|---|
| 2009/0118910 A1* | 5/2009 | Carr et al. ................ 701/50 |
| 2010/0116974 A1 | 5/2010 | Liu et al. |
| 2011/0046776 A1 | 2/2011 | Goldman et al. |
| 2012/0042813 A1 | 2/2012 | Liu et al. |
| 2012/0046838 A1 | 2/2012 | Landphair et al. |

FOREIGN PATENT DOCUMENTS

| | | |
|---|---|---|
| DE | 102005010686 A1 | 10/2005 |
| EP | 1415523 B1 | 10/2006 |
| EP | 2227932 A1 | 9/2010 |
| EP | 2322026 A1 | 5/2011 |
| EP | 2420122 A1 | 2/2012 |
| WO | 2011053286 | 5/2011 |

OTHER PUBLICATIONS

European Search Report, dated Jul. 17, 2013 (6 pages).

* cited by examiner

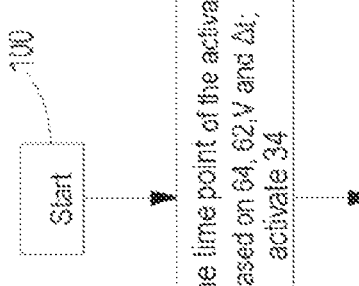
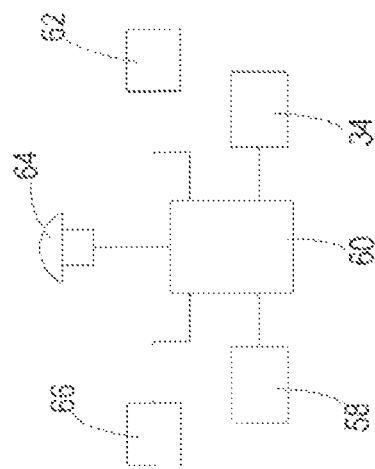
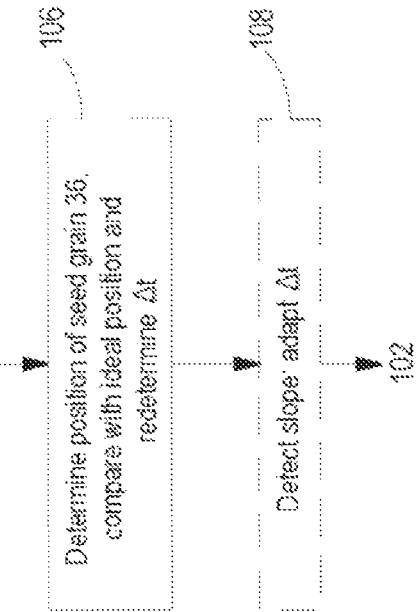
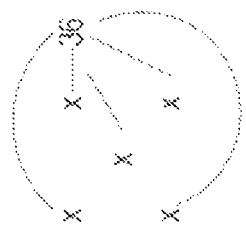

ASSEMBLY AND METHOD FOR THE PRECISION DRILLING OF SEED GRAINS

FIELD

The invention relates to an assembly for the precision drilling of seed grains.

BACKGROUND

In farming, plants, such as maize or beets, which are grown with relatively large spaces between one another, are normally drilled by individual seed drilling machines. A tractor thereby moves several row units, which are attached side by side next to one another along a tool bar, over a field and the row units are controlled in such a way that the seed material is discharged at intervals which are as regular as possible. Since the row units cannot cover the entire field in a single crossing, the tractor must turn at the end of the field after drilling a first strip and must then travel over the field in the opposite direction and discharge the seed material on a second strip of the field.

EP 1 415 523 A1, regarded as being of the generic type, proposes in contrast equipping the individual row units of a drilling machine with an associated drive and controlling these drives centrally by using an external position-determining system in order to obtain a predetermined drilling pattern. The discharge point of the individual seed grains is detected by means of a seed material sensor in order to identify the angular position of a drilling disc of the row unit. Based on these measures, a two-dimensional drilling pattern can indeed be produced, but detecting the actual position of the seed grain is not always sufficiently accurate, since the time between the discharge of the seed grain through the drilling disc and the moment the seed grain reaches its final position in the ground can be different, for example in the case of seed grains of different sizes, and the spatial stagger between the discharge of the seed grain through the drilling disc and its reaching its final position in the ground depends on the travelling speed of the tractor, which is not necessarily constant. Thus with the assembly according to EP 1 415 523 A1, undesired offsets between adjacent plant rows are still possible.

This problem also arises for the assembly according to DE 10 2005 010 686 A1 in which the drives of the cell wheels of the row units are controlled using a position-determining system in order to align the delivery points of adjoining rows with one another, and the drives are synchronized with one another through incremental encoders.

It is furthermore proposed to detect the position of seed grains in the furrow using a seed material sensor and to control the drives of the drilling units so that desired relative spacings of the plants in the travel direction are obtained (EP 2 227 932 A1), or to detect the seed material optically as it falls through the seed material tubes and using a position-determining system and the measured forward speed of the drilling machine to determine the delivery position and to register it in a chart (U.S. Pat. No. 6,941,225).

The invention is concerned with the problem of improving a drilling machine which has at least one row unit to the extent that a desired drilling pattern can be obtained with higher precision compared with the prior art.

SUMMARY

An assembly for the precision drilling of seed grains comprises a drilling machine with at least one row unit which is assigned a drive set up for instigating delivery of a seed grain into a furrow, and a control system, which is connected to a position-determining system, to a memory device for storing delivery positions of seed grains, to the drive of the row unit and to a seed material sensor for detecting the actual delivery position of the seed grains in the furrow. The control system controls the drive based on signals from the position-determining system, the memory device and the seed material sensor so that the seed grains are deposited successively at the delivery positions.

The control system therefore does not, as in the prior art according to EP 1 415 523 A1 and DE 10 2005 010 686 A1, depend on the time and spatial stagger between the delivery of the seed grain through the drilling disc or the cell wheels and its final position in the furrow being constant, but instead detects the actual position of the seed material in the furrow. Sources of error which hitherto were not taken into consideration, such as the forward drive speed of the drilling machine, different drop speeds of the seed material in the seed tubes determined by the sizes of the seed grains, and a possible slope of the ground in the forward direction are thereby now taken into account, thus making it possible to maintain the desired delivery position with higher precision compared to the prior art.

As a rule, the drilling machine comprises a plurality of row units arranged side by side next to one another in a row and are assigned one common drive or a separate drive for each unit. The drive or drives are controlled by a common control system (or one assigned to the row unit). The row units can be attached in one row or offset relative to one another in the forward direction. A seed material sensor can be assigned to each row unit or only one part of the row units or only a single row unit can be equipped with a seed material sensor.

In particular, a camera is used as seed material sensor, although laser scanners or one-dimensional line sensors can also be used for detecting the seed grain or a light beam or a thermosensor could be used for detecting heated-up seed material.

In a preferred embodiment of the invention, the control system is connected to means for detecting the slope of the ground in the forward direction and can be operated to anticipate and take into account the influence of the sloping ground in the forward direction on the position of the seed grains. If the seed material consequently rolls down when driving over slopes, the control system learns of this factor from signals from the seed material sensor and the means for detecting the slope of the ground and during subsequent downhill driving it automatically shifts the seed delivery in time, in order not to first learn from the seed material sensor that one or more seed grains were deposited at the wrong location in the furrow. The means for detecting the slope of the ground can be a ground slope sensor. It would however also be conceivable to use experience (for the sensed position of the seed material and/or a ground slope derived therefrom or from detected three-dimensional position data) from the preceding driving track in order to form an initial value for the first seed grains of the new row.

It is also possible to use the control system to evaluate a time stagger $\Delta t$ between the activation of the drive and the moment the seed grain reaches its final position in the furrow on the basis of the signals from the seed material sensor and to take into consideration this time stagger $\Delta t$ together with the current forward drive speed v when controlling the drive. The time stagger $\Delta t$ can be determined from the position of the seed grain in the furrow detected by the seed material sensor (taking into account the current forward drive speed v and the geometry of the seed material sensor and the row unit)

and/or from the moments in time of the activation of the drive and the confirmation of the seed grain in the furrow.

It is also possible that the control system stores in the memory device the delivery positions of the seed grains in the furrow detected by the seed material sensor and the position-determining system during a first crossing of the field. The control system thus has information available as to the positions in which the seed grains have actually been deposited. This information is then used in a following crossing, i.e. during a subsequent field crossing adjoining the area of the field which has already been drilled, to control the drive in order ensure that the seed grains are deposited at the desired position relative to the positions deposited during the first crossing in this second run.

This can take place in detail using the time stagger Δt described above and forward drive speed or a spatial stagger Δx is evaluated between the position at which the drilling machine is located during activation of the drive, and the actual position at which the seed grain is deposited in the furrow. This stagger can be created during the first field crossing and then during the following crossing the drive is activated further forward or back by the stagger Δx, whereby it is expedient to keep the forward drive speed constant. As an alternative to this, the stagger Δx is first determined continuously during the following crossing from the signals from the seed material sensor and is taken into consideration when controlling the drive.

BRIEF DESCRIPTION OF THE DRAWINGS

An embodiment of the invention described below in further detail is illustrated in the drawings. In the drawings:

FIG. 3 shows a schematic of a control system for controlling the row units;

FIG. 4 shows a flow chart for a first procedure, according to which the control system can operate;

FIG. 5 shows a further possible design of a seed pattern; and

DETAILED DESCRIPTION

Figure 1:
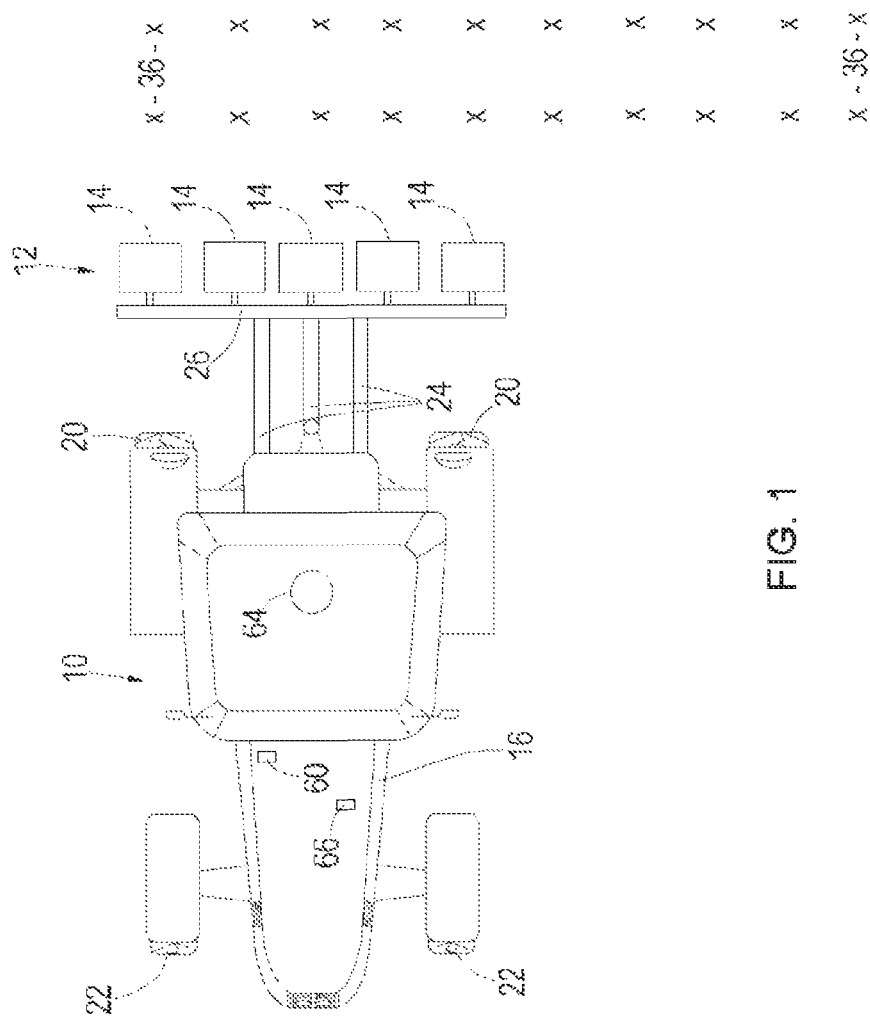
FIG. 1 shows a plan view of a tractor with a drilling machine attached thereto.

FIG. 1 shows a plan view of a combination of a tractor 10 and a drilling machine 12 fixed thereto having a number of row units 14 spread out over the width of the drilling machine 12 for introducing seed material into the ground, although any other type of drilling machine 12 can also be used. The row units 14 can lie in a line, as shown, or can be fixed offset relative to one another in the forward direction. The tractor 10 comprises a vehicle chassis 16 with rear drivable wheels 20 and front steerable wheels 22. A tool bar 26 which extends horizontally and transversely to the forward direction of the tractor 10, which in FIG. 1 runs from right to left, is attached to a three-point hitch device 24 with upper and lower links fixed on the vehicle chassis 16. The tool bar 26 holds the row units 14 of the drilling machine 12. The drilling machine 12 could also be fixed in any other way on the tractor 10, by way of example it could rest on a vehicle chassis and be drawn by a tow bar. The drilling machine 12 could also be designed as a pneumatic drilling machine.

Figure 2:
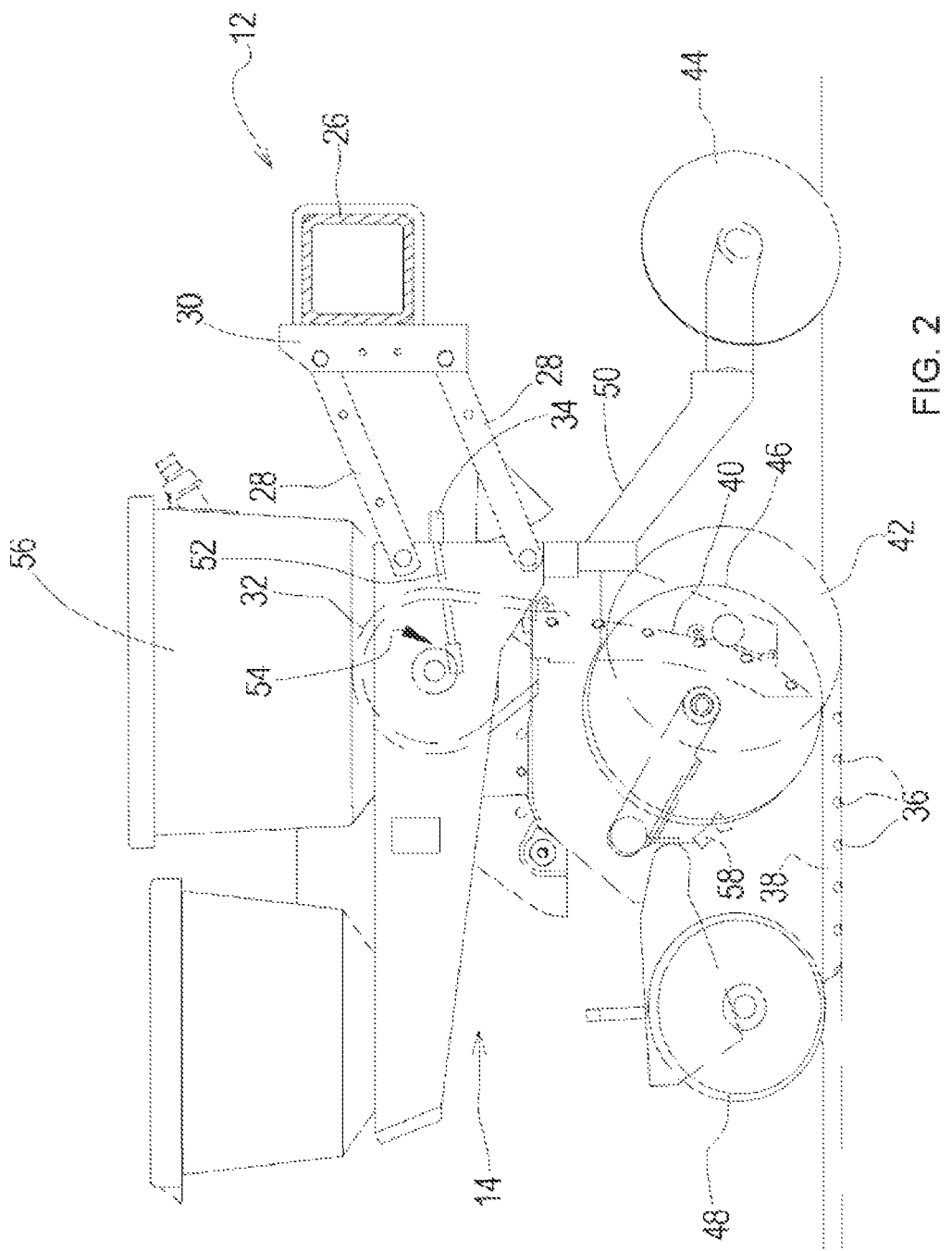
FIG. 2 shows a side view of a row unit of the drilling machine.

FIG. 2 shows a side view of a single one of the identical row units 14 of the drilling machine 12. The row unit 14 is connected by pivotable parallel links 28 to a bracket 30 which is fixed on the tool bar 26. The row unit 14 is thereby movable in the vertical direction in order to follow the contour of the ground. A seed meter or dosing system 32 is drivable by drive 34 which may be an electric motor, stepper motor, linear actuator, solenoid, etc, assigned to it in order to deposit seed grains 36 through a seed tube 40 at a predetermined spacing at predetermined positions into a furrow 38. The furrow 38 is formed by a double-disc furrow opener 42. A disc coulter 44 mounted in front of the furrow opener 42 helps to cut through impurities and plant residues from the previous planting season. Depth-adjusting wheels 46, which are arranged on both sides and offset slightly rearwards next to the furrow openers 42, fix the depth with which the furrow openers 42 penetrate into the ground, and thus the depth of the furrow 38. At the back of the depth-adjusting wheels 46 there are closing wheels 48 which lay soil on the furrow 38 and thus close it up. The disc coulter 44, the depth-adjusting wheels 46 and the closing wheels 48 are attached to the frame 50 of the row unit 14 such that they are rotatable about centre axes which extend generally horizontally and transversely to the forward direction.

The drive 34 is connected by a shaft 52 and a worm gearing 54 to the seed meter 32 which draws successive seed grains 36 out of a container 56 and deposits them through the seed tube 40 into the furrow 38. The seed meter 32 can be of any structure, for example having a cell wheel or a drilling disc with brushes or recesses for receiving seed grains 36. A seed material sensor 58 in the form of a camera monitors the seed grains 36 in the furrow 38. It would also be conceivable to provide only one common drive (not shown) for all the seed meters 32, which then drives these via a transverse shaft which is mounted on the tool bar 26 as shown in EP 2 322 026 A1 hereby incorporated herein by reference.

As shown in FIG. 3, a control system 60 is connected to the seed material sensor 58, to the drive 34 and to a position-determining system 64 which has a receiver for receiving signals from a satellite-based system, such as GPS (Global Positioning System), Galileo or GLONASS, and preferably a further receiver for receiving correction signals transmitted via radio waves, in order to be able to determine the position of the tractor 10 with the most precision possible. The position-determining system 64 can also serve for automatically steering the tractor 10. Finally, the control system 60 is also connected to a memory unit 62. The position-determining system 64 and/or the control system 60 could also, different to that shown, be located on the drilling machine 12. Different to that shown in FIG. 3, the control system 60 is connected to drives 34 of all the row units 14 and seed material sensors 58 of all the row units 14.

The control system 60 works during operation according to the flow chart of FIG. 4. After the start in step 100, in step 102 the relevant next time point t is determined at which the drive 34 is to be activated in order to deposit a further seed grain 36 in the furrow 38. It is determined first at which (two- or three-dimensionally detected) ideal position x the next seed grain 36 is to be deposited, for which corresponding data is drawn from the memory unit 62. For this, a chart can be stored in the memory unit 62, in which all the positions of a field where a seed grain 36 is to be deposited are recorded. This chart can be created in advance on a farm computer and can be transferred in any way to the memory unit 62 (for example wirelessly or by means of a portable memory chip). It is also conceivable to produce this chart only during the drilling operation by storing the positions of the relevant first seed material deposits of the row units 14 on the field and by stipulating the following seed grain deposit positions using the control system 60, by way of example using predetermined or operator-input spacings in the forward direction and by taking into account the fixed spacings of the row units 14 in the transverse direction.

The chart thereby represents a desired drilling pattern, such as by way of example the quadratic pattern shown in FIG. 1, which—although produced by drilling in opposite travel directions—during subsequent field procedures (such as spraying or cultivating) can be driven over both in the forward direction of the tractor 10 and also crosswise thereto. Any other patterns can however also be created, for example such as the pattern shown in FIG. 5 in which the field can be driven over at angles of +/−45° to the forward direction which applies during drilling, and all plants have the same distances from the respectively next plants.

When determining the time point in step 102 it is furthermore determined at which (two- or three-dimensionally detected) position y the row unit 14 is actually located. For this, the signals from the position-determining system 64 and the known stagger between the position-determining system 64 and the row unit 14 in the forward direction are taken into account. Furthermore, the forward drive speed v of the tractor 10, which can be measured by the position-determining system 64 and/or by suitable sensors for detecting the speed of the wheels 20 and/or 22 or a radar sensor (not shown) for detecting the forward drive speed relative to the ground, and a time stagger Δt between the activation of the drive 34 and the moment the seed grain 36 reaches its final position in the furrow 38 is taken into consideration. In detail, the time point t can be calculated according to the formula $$t = abs(x-y)/v - \Delta t$$

in which t is the amount of time until activation of the drive 34 and abs(x−y) is the absolute amount of the differences between the absolute positions x and y, i.e. the distance between the ideal and actual position in the forward direction.

As soon as the time point for activating the drive 34 is reached, the drive 34 is activated by the control system 60 and a single seed grain 36 is dispensed into the seed tube 40 and into the furrow 38.

In step 104, the seed grain 36 is identified by the seed material sensor 58 in the furrow 38, for which the output signals from the camera are analysed by means of an image processing system.

In step 106, the position of the seed grain 36 is determined, for which the signals from the position-determining system 64 and the seed material sensor 58 as well as the known stagger between the position-determining system 64 and the seed material sensor 58 are used. A comparison then takes place between the actual position of the seed grain 36 and the ideal position defined in step 102. If a deviation (lying above a predetermined threshold value) is ascertained, by way of example because the seed grain 36 was faster or slower than envisaged in step 102, Δt is corrected accordingly. In a first approximation, the distance Δx between the ideal and actual position of the seed grain 36 in the furrow 38 can be divided by the speed v, in order to add the thus obtained correction value to Δt or subtract it therefrom, depending on whether the seed grain 36 was sensed as being too far behind or too far forward. Alternatively or additionally, Δt can also be measured directly by detecting the time points of the discharge of the seed grain 36 (or the activation of the drive 34) and the confirmation of the seed grain 36 in the furrow 38 by the seed material sensor 58.

It should be noted here that with the first call-up of step 102, a stored empirical value can be used for Δt so long as the measured values of steps 104 and 106 are not yet present.

In optional step 108, the incline of the tractor 10 (or of the row units 14) relative to the forward direction can be detected. For this, a slope sensor 66 can be used, or this slope is calculated from two three-dimensional positions detected in succession of the position-determining system 64. If the slope has changed since the last run-through of step 108, Δt is adapted so that the triggering of the drive 34 can take place earlier (if previously travelling uphill and now downhill) or later (if previously travelling downhill and now uphill) and thus the changed rolling behaviour of the seed grain 36 based on a different incline in the forward direction is taken into account.

Step 108 (or step 106) is then followed again by step 102.

Whereas in the preceding text the control of only a single drive 34 was described, the control system 60 controls the drives 34 of all row units 14 according to the diagram of FIG. 4 separately from one another and in succession timewise or at the same time (multi-tasking), although it would also be possible to provide each row unit 14 with its own control system 60.

It is furthermore noted that in the description of FIG. 4 absolute positions were mentioned which can be measured in any terrestrial reference system. In the steps of FIG. 4, however, alternative relative positions can be used which relate by way of example to the reference system of the tractor 10 or the drilling machine 12. An absolute referencing of the reference systems used before and after the change of travel direction relative to one another would then only be provided if the travel direction of the tractor 10 changes.

Figure 6:
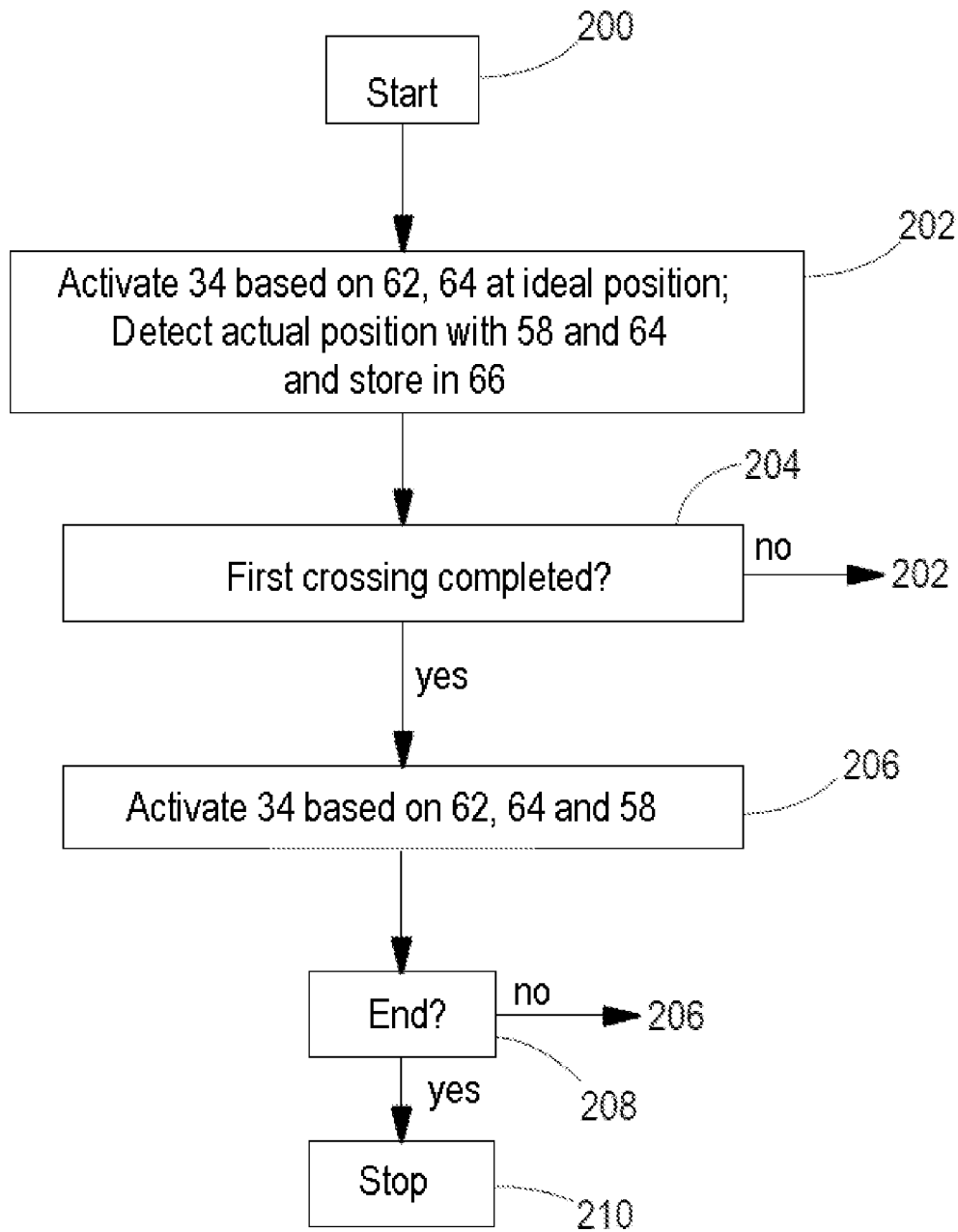
FIG. 6 shows a flow chart for a second procedure, according to which the control system can operate.

FIG. 6 shows a flow chart according to which the control system 60 could proceed in an alternative way to that shown in the flow chart of FIG. 4. The start in step 200 is followed by step 202 in which the control system 60 controls the drives 34 (or the single drive 34 for all row units 14) based on the signals from the position-determining system 64 and data from the memory unit 62 which in the manner described in relation to step 102 define the positions at which seed grains 36 are to be dispensed into the furrows 38, in such a way that the seed grains 36 are deposited at the desired positions over the area of the field which has been crossed, in order to drill a first part of the desired drilling pattern. The actual positions of the seed grains 36 in the furrow 38 are detected in this step 202 geo-referenced from the signals from the seed material sensor 58 and the position-determining system 64 (and the known stagger between the position-determining system 64 and the field of vision of the seed material sensor 58), and recorded in the memory unit 62.

Step 204 follows, in which it is queried whether the first crossing of the field has been completed, which can be detected from the signals from the position-determining system 64. If this is not the case then step 202 follows again, otherwise step 206 follows.

In step 206 a following crossing now takes place in which the seed material is to be lined up as accurately as possible with the seed material discharged during the first crossing (step 202) in order to achieve the desired drilling pattern (see the examples in FIGS. 1 and 5). In this step 206, the drive 34 (or the drives 34) is/are for this purpose additionally controlled on the basis of the signals from the seed material sensor 58. Through this seed material sensor 58, the actual position of the seed grains 36 discharged in step 206 in the furrow 38 can be detected and compared with the ideal position determined from the actual position stored in step 202 during the first crossing so that the control system has available information on a stagger Δx between the actual position and ideal position as control input parameters, and this stagger is brought down as precisely as possible to zero through corresponding control of the drive 34. This control can be location-based, i.e. take place purely based on the stagger Δx, or time-based, as explained with regard to steps 102 to 106.

This stagger Δx could as an alternative to this also be already determined in step 202 and then in step 206 the drive is activated further forward or back in the forward direction by a stretch corresponding to the stagger Δx in order to even out this stagger. The stagger Δx can thereby be selected evenly for the entire field or can depend on the relevant position along the driving track. This procedure is particularly suitable when the forward drive speed of the tractor is sufficiently constant.

Step 206 is followed by step 208, in which it is queried whether the drilling process has been completed over the field, for which reference can likewise be made to the signals from the position-determining system 64. If the process has not yet been completed, then step 206 follows again, otherwise the end is in step 210.

After drilling the seed grains 36 over the entire field, an accurate chart is available in the memory unit 62 showing the places at which the seed grains 36 have been deposited on the field. This chart can be used to set up a route plan for future field work which is composed of crossings of the field running in the drilling direction or in a direction including an angle with the drilling direction (see FIGS. 1 and 5). Setting up the route plan can be carried out during drilling or afterwards on any computer to which the chart is transferred wirelessly or by means of a portable memory medium.

The invention claimed is:

1. Assembly for the precision drilling of seed grains, comprising:
a drilling machine with at least one row unit which is assigned a drive set up for instigating delivery of a seed grain into a furrow, and a control system, which is connected to a position-determining system, to a memory unit for storing delivery positions of seed grains, to the drive of the row unit and to a seed material sensor for detecting an actual delivery position of the seed grains and which can be operated to control the drive based on signals from the position-determining system, the memory unit and the seed material sensor so that the seed grains are deposited successively at the delivery positions, wherein the seed material sensor is adapted to detect the final position of the seed grain in the furrow; and wherein the control system can be operated to evaluate on the basis of the signals from the seed material sensor a time stagger (Δt) between activation of the drive and the moment the seed grain reaches its final position in the furrow and to take this into consideration together with a current machine forward drive speed (v) when controlling the drive.

2. The assembly according to claim 1, wherein the drilling machine comprises a plurality of row units arranged side by side next to one another in a row or are offset relative to one another in the forward direction, wherein each row unit is assigned one drive controllable separately by the control system.

3. The assembly according to claim 1, wherein the drilling machine comprises a plurality of row units arranged side by side next to one another in a row or are offset relative to one another in the forward direction, wherein all the row units are assigned one common drive controllable by the control system.

4. The assembly according to claim 2, wherein at least one of the row units is assigned the seed material sensor.

5. The assembly according to claim 1, wherein the seed material sensor comprises one of a camera, a laser scanner, a one-dimensional line sensor for detecting the seed grain, a light beam and a thermosensor for detecting heated-up seed material.

6. The assembly according to claim 1, wherein the control system is connected to means for detecting the slope of the ground in the forward direction and is adapted to anticipate and take into account the influence of the sloping ground in the forward direction on the position of the seed grains in the control of the drive.

7. The assembly according to claim 1, wherein the control system can be operated to determine the time stagger (Δt) between activation of the drive and the moment the seed grain reaches its final position in the furrow from the position of the seed grain in the furrow detected by the seed material sensor from the time points of the activation of the drive and the confirmation of the seed grain in the furrow.

8. The assembly according to claim 1, wherein the control system can be operated to store the delivery positions of the seed grains in the furrow during one crossing of the field and to control the drive during a following crossing based thereon.

9. The assembly according to claim 1, wherein the control system can be operated to determine a stagger (Δx) between an ideal and actual position of the seed grain during a first crossing of the field and a following crossing and to minimize this stagger during the following crossing through suitable control of the drive.

10. A method for the precision drilling of seed grains, wherein:
a drilling machine with at least one row unit is assigned a drive set up for instigating delivery of a seed grain into a furrow, and a control system is connected to a position-determining system, to a memory unit for storing delivery positions of seed grains, to the drive of the row unit and to a seed material sensor for detecting an actual delivery position of the seed grains and controls the drive based on signals from the position-determining system, the memory unit and the seed material sensor so that the seed grains are deposited successively at the delivery positions, wherein the seed material sensor detects the final position of the seed grain in the furrow; and wherein the control system is operated to evaluate on the basis of the signals from the seed material sensor a time stagger (Δt) between activation of the drive and the moment the seed grain reaches its final position in the furrow and to take this into consideration together with a current machine forward drive speed (v) when controlling the drive.

11. The method according to claim 10, wherein, after drilling the seed grains, a chart is provided in the memory unit of the control system to show the positions at which the seed grains were deposited on the field and this chart is used to set up a route plan for future field works, wherein the route plan is composed from crossings of the field running in at least one direction including the drilling direction and in a direction at an angle with the drilling direction.

* * * * *